(12) United States Patent
Noh et al.

(10) Patent No.: US 8,123,986 B2
(45) Date of Patent: Feb. 28, 2012

(54) PASTE, METHOD OF MANUFACTURING PLASMA DISPLAY PANEL USING THE PASTE AND PLASMA DISPLAY APPARATUS

(75) Inventors: Jung Sok Noh, Gumi-si (KR); Young Woo Seo, Gumi-si (KR); Chang Min Han, Gumi-si (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/279,199

(22) PCT Filed: Jun. 26, 2007

(86) PCT No.: PCT/KR2007/003086
§ 371 (c)(1),
(2), (4) Date: Oct. 28, 2008

(87) PCT Pub. No.: WO2008/002055
PCT Pub. Date: Jan. 3, 2008

(65) Prior Publication Data
US 2009/0066248 A1   Mar. 12, 2009

(30) Foreign Application Priority Data

Jun. 29, 2006   (KR) .......................... 10-2006-0059574
Jun. 29, 2006   (KR) .......................... 10-2006-0059575

(51) Int. Cl.
*H01B 1/02* (2006.01)
(52) U.S. Cl. ...................... 252/518.1; 252/500; 252/511; 252/519.33; 313/582; 313/586; 313/630; 430/270.1; 430/319; 430/320; 430/321
(58) Field of Classification Search .......... 252/512–514, 252/519.19, 519.33, 500, 511, 518.1; 106/287.18; 313/582, 584, 586, 630; 430/270.1, 319, 320, 321
See application file for complete search history.

(56) References Cited

U.S. PATENT DOCUMENTS 6,075,319 A * 6/2000 Kanda et al. .................. 313/584
(Continued)

FOREIGN PATENT DOCUMENTS

CN   1579608 A   2/2005
(Continued)

OTHER PUBLICATIONS

Chinese Office Action dated Dec. 4, 2009, for Application No. 200780006357.9, 11 pages.
(Continued)

*Primary Examiner* — Khanh Tuan Nguyen
(74) *Attorney, Agent, or Firm* — Fish & Richardson P.C.

(57) ABSTRACT

A plasma display device and a method of manufacturing a plasma display panel (PDP) are provided. The method includes applying onto a substrate a black matrix paste for forming a black matrix and an electrode paste for forming an electrode; laminating a dielectric material on the substrate; and firing the black matrix paste, the electrode paste, and the dielectric material at the same time. Therefore, it is possible to simplify the manufacture of a PDP by firing electrodes, black matrices, and a dielectric material at the same time. In addition, it is possible to reduce the probability of the generation of air bubbles by appropriately reducing the amount of glass frit in a paste. Moreover, it is possible to enhance the efficiency of driving a PDP and the reliability of a plasma display device.

11 Claims, 5 Drawing Sheets

U.S. PATENT DOCUMENTS

| | | | |
|---|---|---|---|
| 7,776,507 B2 * | 8/2010 | Kusano et al. | 430/270.1 |
| 2002/0048730 A1 | 4/2002 | Hatori et al. | |
| 2004/0259452 A1 * | 12/2004 | Matsumoto et al. | 445/24 |
| 2005/0130547 A1 | 6/2005 | Oida et al. | |
| 2006/0071202 A1 | 4/2006 | Lee et al. | |

FOREIGN PATENT DOCUMENTS

| | | | |
|---|---|---|---|
| EP | 1168079 A1 | | 1/2002 |
| EP | 1950766 A2 | | 7/2008 |
| JP | 10-064435 | * | 3/1998 |
| JP | 20000-48645 A | | 2/2000 |
| JP | 2003-016928 A | | 1/2003 |
| JP | 2004-087495 | * | 3/2004 |
| JP | 2004-087495 A | | 3/2004 |
| WO | WO 2006/009091 A1 | * | 1/2006 |

OTHER PUBLICATIONS

European Search Report dated Feb. 18, 2011 for Application No. 07747108.4, 7 pages.

* cited by examiner

[Fig. 1]
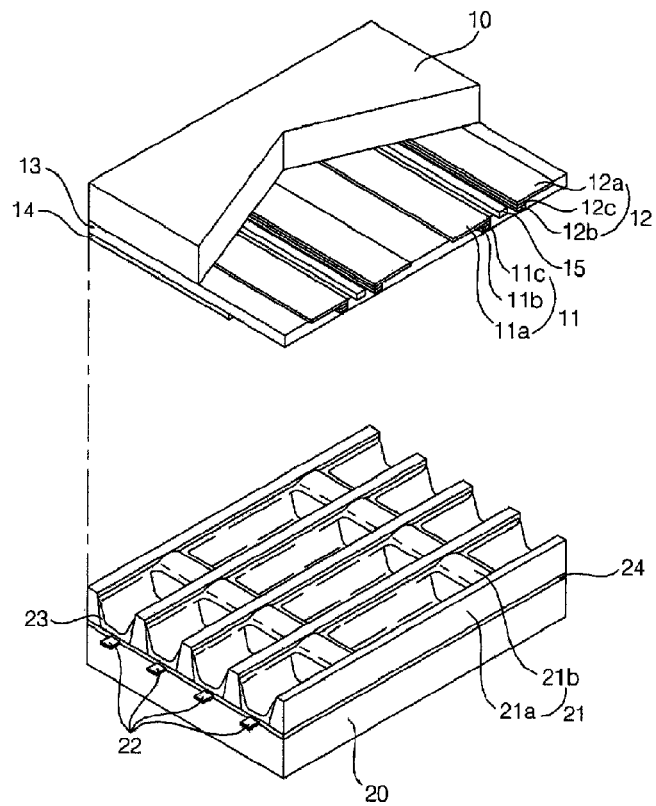
[Fig. 2]
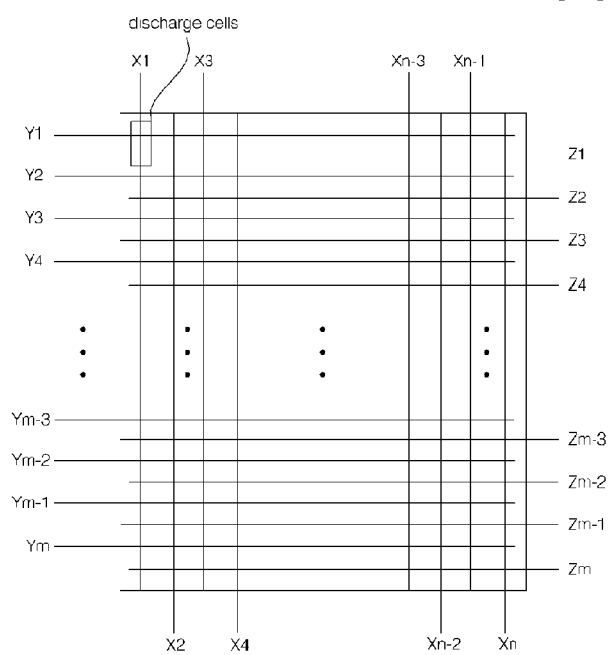

[Fig. 3]
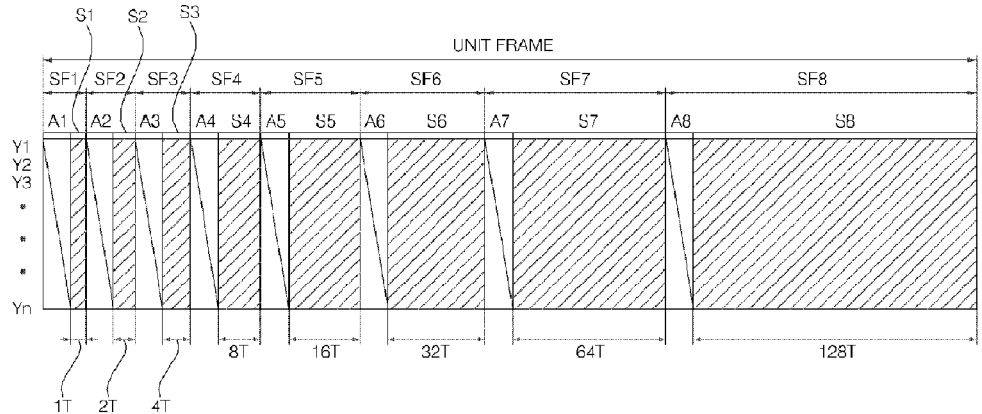
[Fig. 4]
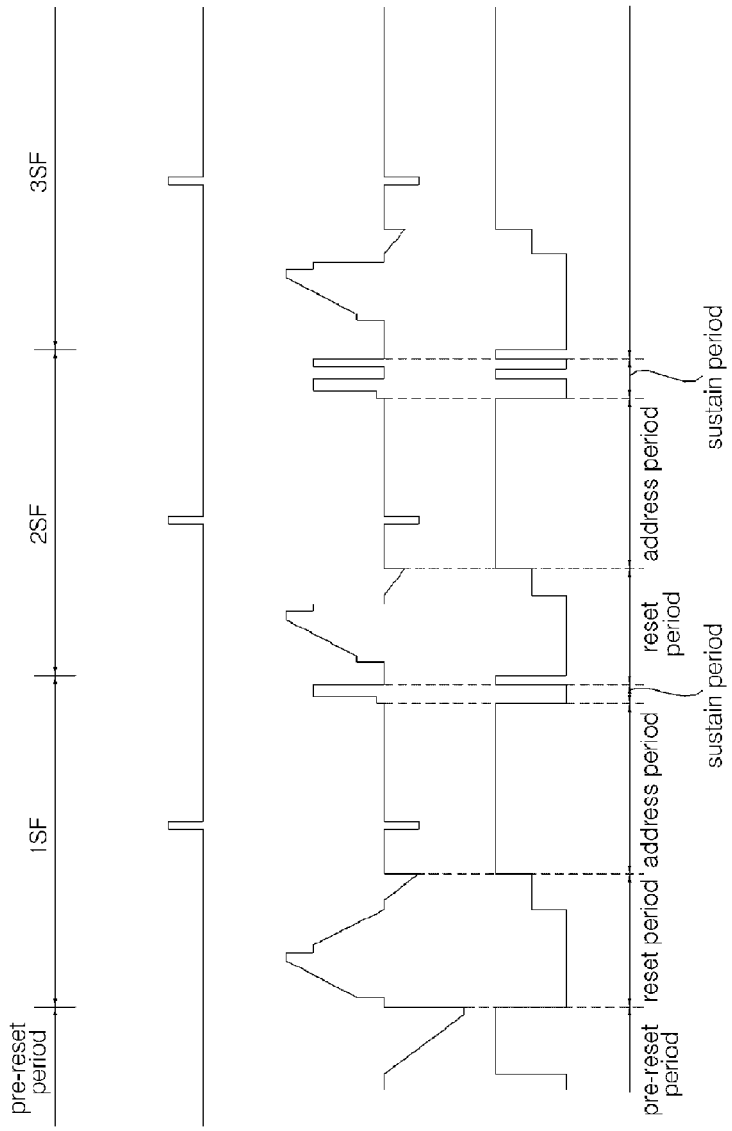

[Fig. 5]
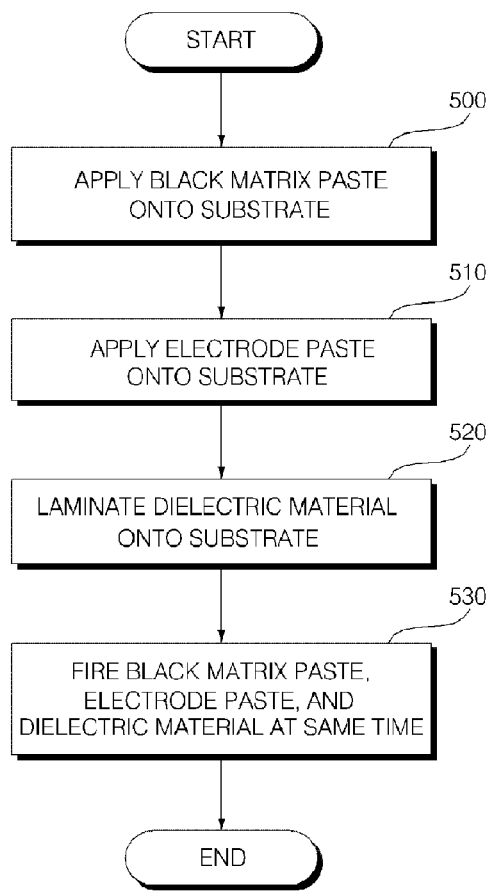
[Fig. 6]
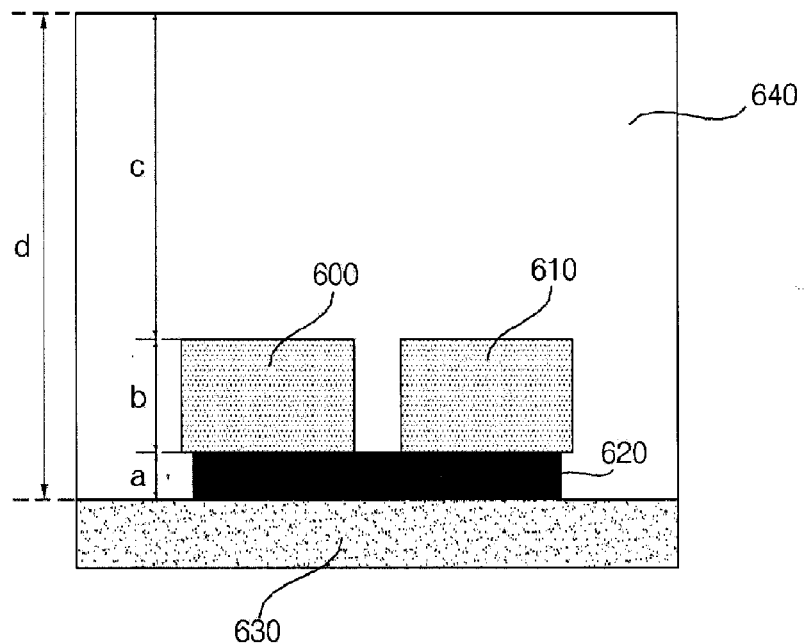

[Fig. 7]
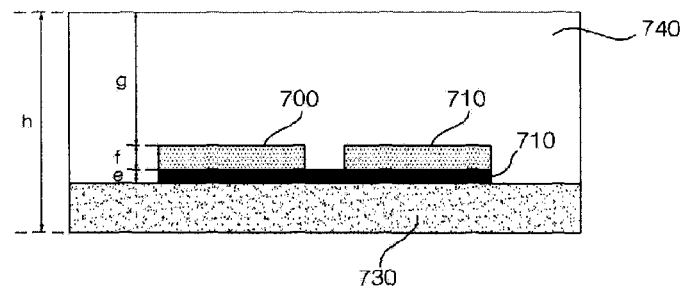
[Fig. 8]
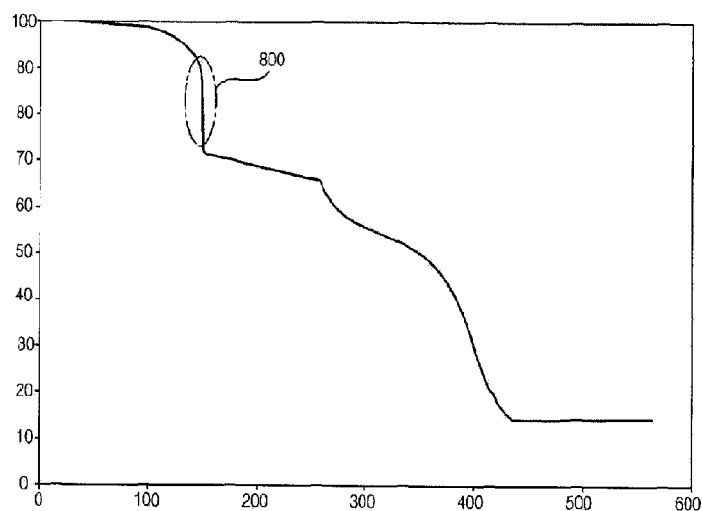
[Fig. 9]
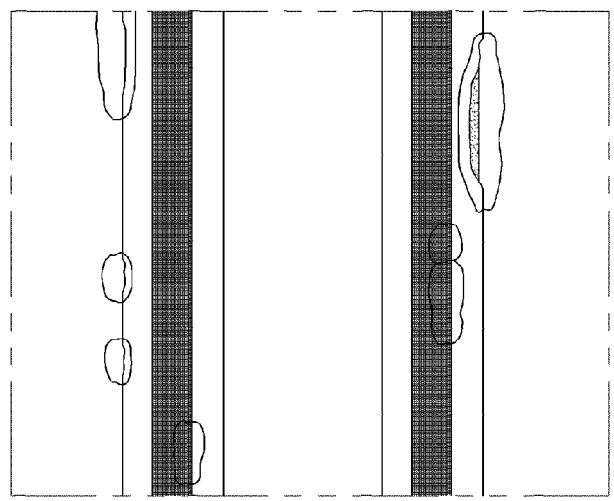

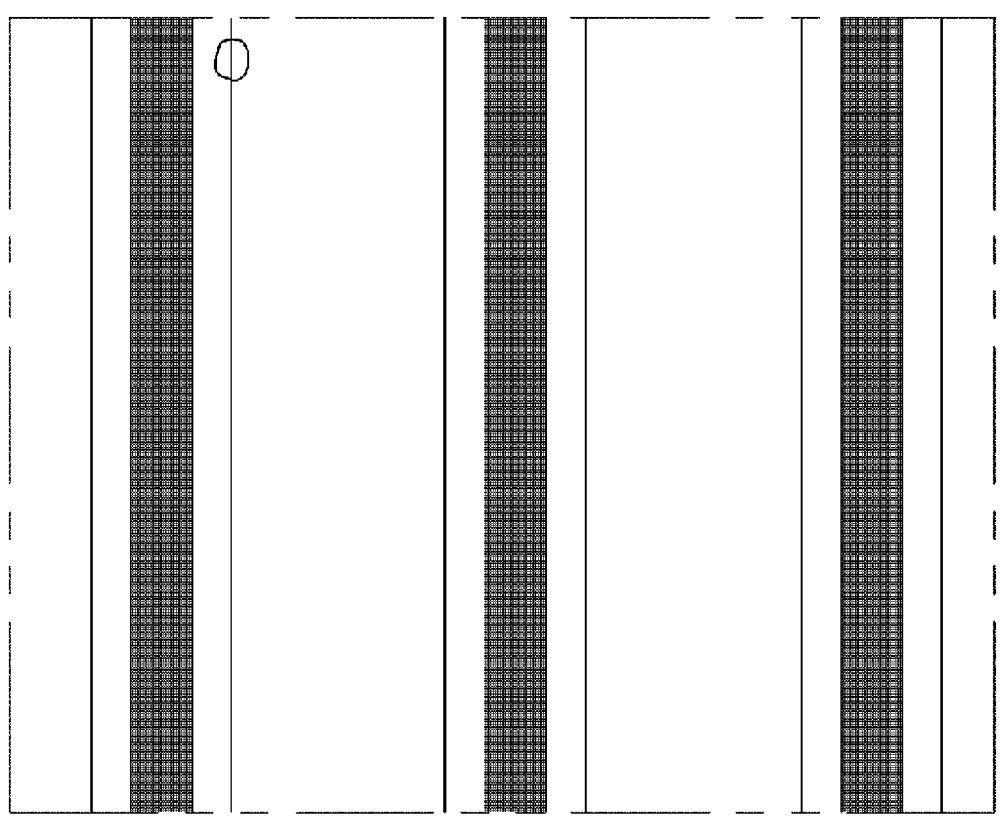
[Fig. 10]

PASTE, METHOD OF MANUFACTURING PLASMA DISPLAY PANEL USING THE PASTE AND PLASMA DISPLAY APPARATUS

TECHNICAL FIELD

The present invention relates to a plasma display device, and more particularly, to a method of manufacturing a plasma display panel (PDP) of a plasma display device, and a paste which is used to form electrodes and black matrices of a PDP.

BACKGROUND ART

In general, a plasma display panel (PDP) includes an upper substrate, a lower substrate, and a plurality of barrier ribs which are disposed between the upper substrate and the lower substrate and define a plurality of cells, and each of the cells is filled with a main discharge gas such as neon (Ne), helium (He) or a mixed gas (Ne+He) of neon and helium and an inert gas including a small amount of xenon. When a discharge occurs due to a high-frequency voltage, an inert gas generates vacuum ultraviolet (UV) rays, and the UV rays excite a phosphor layer between the barrier ribs, thereby realizing an image. PDPs are thin and light-weighted and have long been expected to become dominant next-generation display devices.

A conventional PDP includes an upper panel on which images are displayed and a lower substrate which is a predetermined distance apart from the upper panel and is coupled in parallel to the upper substrate. A plurality of sustain electrode pairs, a plurality of black matrices, and a dielectric layer are formed on the upper substrate, and a plurality of address electrodes, a phosphor layer, and a dielectric layer is formed on the lower substrate. Each of the sustain electrode pairs includes a scan electrode and a sustain electrode, and the address electrodes intersect the sustain electrode pairs.

The manufacture of such conventional PDP generally involves manufacturing a glass substrate, manufacturing an upper panel, manufacturing a lower panel, and assembling a PDP. During the manufacture of upper and lower panels, and particularly, during the firing of electrodes, black matrices or a dielectric layer, air bubbles may be generated. In this case, when a voltage is applied, the dielectricity of electrodes may break down due to the concentration of the voltage on portions of the electrodes including air bubbles, thereby damaging an upper or lower panel and eventually reducing the reliability of a plasma display device.

DISCLOSURE OF INVENTION

Technical Problem

The present invention provides a paste for forming black matrices which can simplify the manufacture of a plasma display panel (PDP and prevent a PDP from being damaged by air bubbles, a method of manufacturing a PDP, and a plasma display device.

Technical Solution

According to an aspect of the present invention, there is provided a paste for forming an electrode, the paste including organic components and inorganic components including glass frit and a conductive metal, wherein the glass frit is 1.5-4 weight % of the paste.

According to another aspect of the present invention, there is provided a paste for forming a black matrix, the paste including organic components and inorganic components including glass frit and cobalt oxide, wherein the glass frit is 1.5-4 weight % of the paste.

According to another aspect of the present invention, there is provided a method of manufacturing a PDP including electrodes, black matrices, and a dielectric material, the method including applying onto a substrate a black matrix paste for forming a black matrix and an electrode paste for forming an electrode; laminating a dielectric material on the substrate; and firing the black matrix paste, the electrode paste, and the dielectric material at the same time.

According to another aspect of the present invention, there is provided a plasma display device including an upper substrate; a first electrode, a second electrode, and a black matrix which are formed on the upper substrate; a lower substrate which faces the upper substrate; and a third electrode which is formed on the lower substrate, wherein at least one of the first, second, and third electrodes includes glass frit and a conductive metal and the glass frit is 2.5-4 weight % of whichever of the first, second, and third electrodes includes the glass frit.

According to another aspect of the present invention, there is provided a plasma display device including an upper substrate; a first electrode, a second electrode, and a black matrix which are formed on the upper substrate; a lower substrate which faces the upper substrate; and a third electrode which is formed on the lower substrate, wherein the black matrix includes glass frit and cobalt oxide and the glass frit is 15 25 weight % of the black matrix.

ADVANTAGEOUS EFFECTS

It is possible to simplify the manufacture of a PDP by firing electrodes, black matrices, and a dielectric material at the same time. In addition, it is possible to reduce the probability of the generation of air bubbles by appropriately reducing the amount of glass frit in a paste. Moreover, it is possible to enhance the efficiency of driving a PDP and the reliability of a plasma display device.

BRIEF DESCRIPTION OF THE DRAWINGS

FIG. 1 is a perspective view of a plasma display panel (PDP) according to an embodiment of the present invention;

FIG. 2 is a cross-sectional view for explaining the arrangement of electrodes in a PDP;

FIG. 3 is a timing diagram for explaining a time-division method of driving a PDP in which a frame is divided into a plurality of sub-fields;

FIG. 4 is a timing diagram illustrating the waveforms of driving signals used to drive a PDP, according to an embodiment of the present invention;

FIG. 5 is a flowchart illustrating a method of manufacturing a PDP according to an embodiment of the present invention;

FIG. 6 is a cross-sectional view of a structure including a substrate and a black matrix paste, electrode pastes, and a dielectric material that are formed on the substrate and are yet to be fired, according to an embodiment of the present invention;

FIG. 7 is a cross-sectional view of a structure obtained by performing a firing operation on the structure illustrated in FIG. 6, according to an embodiment of the present invention; and FIG. 8 is a graph for explaining a method of firing both black matrices and a dielectric material at the same time according to an embodiment of the present invention; and FIGS. 9 and 10 illustrate black matrices, electrodes, and a dielectric material that are formed on a substrate, according to an embodiment of the present invention.

BEST MODE FOR CARRYING OUT THE INVENTION

The present invention will hereinafter be described in detail with reference to the accompanying drawings in which exemplary embodiments of the invention are shown.

FIG. 1 is a perspective view of a display device according to an embodiment of the present invention. Referring to FIG. 1, a plasma display panel (PDP) includes an upper substrate 10, a plurality of electrode pairs which are formed on the upper substrate 10 and consist of a scan electrode 11 and a sustain electrode 12 each; a lower substrate 20; and a plurality of address electrodes 22 which are formed on the lower substrate 20.

Each of the electrode pairs includes transparent electrodes 11a and 12a and bus electrodes 11b and 12b. The transparent electrodes 11a and 12a may be formed of indium-tin-oxide (ITO). The bus electrodes 11b and 12b may be formed of a metal such as silver (Ag) or chromium (Cr) or may be comprised of a stack of chromium/copper/chromium (Cr/Cu/Cr) or a stack of chromium/aluminium/chromium (Cr/Al/Cr). The bus electrodes 11b and 12b are respectively formed on the transparent electrodes 11a and 12a and reduce a voltage drop caused by the transparent electrodes 11a and 12a which have a high resistance.

According to an embodiment of the present invention, each of the electrode pairs may be comprised of the bus electrodes 11b and 12b only. In this case, the manufacturing cost of the PDP can be reduced by not using the transparent electrodes 11a and 12a. The bus electrodes 11b and 12b may be formed of various materials other than those set forth herein, e.g., a photosensitive material.

Black matrices are formed on the upper substrate 10. The black matrices perform a light shied function by absorbing external light incident upon the upper substrate 10 so that light reflection can be reduced. In addition, the black matrices enhance the purity and contrast of the upper substrate 10.

In detail, the black matrices include a first black matrix 15 which overlaps a plurality of barrier ribs 21, a second black matrix 11c which is formed between the transparent electrode 11a and the bus electrode 11b of each of the scan electrodes 11, and a second black matrix 12c which is formed between the transparent electrode 12a and the bus electrode 12b. The first black matrix 15 and the second black matrices 11c and 12c, which can also be referred to as black layers or black electrode layers, may be formed at the same time and may be physically connected. Alternatively, the first black matrix 15 and the second black matrices 11c and 12c may not be formed at the same time, and may not be physically connected.

If the first black matrix 15 and the second black matrices 11c and 12c are physically connected, the first black matrix 15 and the second black matrices 11c and 12c may be formed of the same material. On the other hand, if the first black matrix 15 and the second black matrices 11c and 12c are physically separated, the first black matrix 15 and the second black matrices 11c and 12c may be formed of different materials.

An upper dielectric layer 13 and a passivation layer 14 are deposited on the upper substrate 10 on which the scan electrodes 11 and the sustain electrodes 12 are formed in parallel with one other. Charged particles generated as a result of a discharge accumulate in the upper dielectric layer 13. The upper dielectric layer 13 may protect the electrode pairs. The passivation layer 14 protects the upper dielectric layer 13 from sputtering of the charged particles and enhances the discharge of secondary electrons.

The address electrodes 22 are formed and intersects the scan electrode 11 and the sustain electrodes 12. A lower dielectric layer 23 and the barrier ribs 21 are formed on the lower substrate 20 on which the address electrodes 22 are formed.

A phosphor layer is formed on the lower dielectric layer 23 and the barrier ribs 21. The barrier ribs 21 include a plurality of vertical barrier ribs 21a and a plurality of horizontal barrier ribs 21b that form a closed-type barrier rib structure. The barrier ribs 21 define a plurality of discharge cells and prevent ultraviolet (UV) rays and visible rays generated by a discharge from leaking into the discharge cells.

The present invention can be applied to various barrier rib structures, other than that set forth herein. For example, the present invention can be applied to a differential barrier rib structure in which the height of vertical barrier ribs 21a is different from the height of horizontal barrier ribs 21b, a channel-type barrier rib structure in which a channel that can be used as an exhaust passage is formed in at least one vertical or horizontal barrier rib 21a or 21b, and a hollow-type barrier rib structure in which a hollow is formed in at least one vertical or horizontal barrier rib 21a or 21b. In the differential barrier rib structure, the height of horizontal barrier ribs 21b may be greater than the height of vertical barrier ribs 21a. In the channel-type barrier rib structure or the hollow-type barrier rib structure, a channel or a hollow may be formed in at least one horizontal barrier rib 21b.

According to an embodiment of the present embodiment, red (R), green (G), and blue (B) discharge cells are arranged in a straight line. However, the present invention is not restricted to this. For example, R, G, and B discharge cells may be arranged as a triangle or a delta. Alternatively, R, G, and B discharge cells may be arranged as a polygon such as a rectangle, a pentagon, or a hexagon.

The phosphor layer is excited by UV rays that are generated upon a gas discharge. As a result, the phosphor layer generates one of R, G, and B rays. A discharge space is provided between the upper and lower substrates 10 and 20 and the barrier ribs 21. A mixture of inert gases, e.g., a mixture of helium (He) and xenon (Xe), a mixture of neon (Ne) and Xe, or a mixture of He, Ne, and Xe is injected into the discharge space.

FIG. 2 illustrates the arrangement of electrodes in a PDP. Referring to FIG. 2, a plurality of discharge cells that constitute a PDP may be arranged in a matrix. The discharge cells are respectively disposed at the intersections between a plurality of scan electrode lines $Y_1$ through $Y_m$ and a plurality of address electrode lines $X_1$ through $X_n$ or the intersections between a plurality of sustain electrode lines $Z_1$ through $Z_m$ and the address electrode lines $X_1$ through $X_n$. The scan electrode lines $Y_1$ through $Y_m$ may be sequentially or simultaneously driven. The sustain electrode lines $Z_1$ through $Z_m$ may be simultaneously driven. The address electrode lines $X_1$ through $X_n$ may be divided into two groups: a group including odd-numbered address electrode lines and a group including even-numbered address electrode lines. The address electrode lines $X_1$ through $X_n$ may be driven in units of the groups or may be sequentially driven.

The electrode arrangement illustrated in FIG. 2, however, is exemplary, and thus, the present invention is not restricted to this. For example, the scan electrode lines $Y_1$ through $Y_m$ may be driven using a dual scan method in which two of a plurality of scan lines are driven at the same time. The address electrode lines $X_1$ through $X_n$ may be divided into two groups:

a group including upper address electrode lines that are disposed in the upper half of a PDP and a group including lower address electrode lines that are disposed in the lower half of the PDP. Then, the address electrode lines $X_1$ through $X_n$ may be driven in units of the two groups.

FIG. 3 is a timing diagram for explaining a time-division method of driving a PDP in which a frame is divided into a plurality of sub-fields. Referring to FIG. 3, a unit frame is divided into a predefined number of sub-fields, for example, eight sub-fields SF1 through SF8, in order to realize a time-division grayscale display. Each of the sub-fields SF1 through SF8 is divided into a reset period (not shown), an address period (A1, . . . , A8), and a sustain period (S1, . . . , S8).

Not all of the sub-fields SF1 through SF8 may have a reset period. For example, only the first sub-field SF1 may have a reset period, or only the first sub-field and a middle sub-field may have a reset period.

During each of the address periods A1 through A8, a display data signal is applied to an address electrode X, and a scan pulse is applied to a scan electrode Y so that wall charges can be generated in a discharge cell.

During each of the sustain periods S1 through S8, a sustain pulse is alternately applied to the scan electrode Y and a sustain electrode Z so that a discharge cell can cause a number of sustain discharges.

The luminance of a PDP is proportional to the total number of sustain discharge pulses allocated throughout the sustain discharge periods S1 through S8. Assuming that a frame for one image includes eight sub-fields and is represented with 256 grayscale levels, 1, 2, 4, 8, 16, 32, 64, and 128 sustain pulses may be respectively allocated to the sustain periods S1, S2, S3, S4, S5, S6, S7, and S8. In order to obtain luminance corresponding to a grayscale level of 133, a plurality of discharge cells may be addressed during the first, third, and eighth sub-fields SF1, SF3, and SF8 so that they can cause a total of 133 sustain discharges.

The number of sustain discharges allocated to each of the sub-fields SF1 through SF8 may be determined according to a weight allocated to a corresponding sub-field through automatic power control (APC). Referring to FIG. 3, a frame is divided into eight sub-fields, but the present invention is not restricted to this. In other words, the number of sub-fields in a frame may be varied. For example, a PDP may be driven by dividing each frame into more than eight sub-fields (e.g., twelve or sixteen sub-fields).

The number of sustain discharges allocated to each of the sub-fields SF1 through SF8 may be varied according to gamma and other characteristics of a PDP. For example, a grayscale level of 6, instead of a grayscale level of 8, may be allocated to the sub-field SF4, and a grayscale level of 34, instead of a grayscale level of 32, may be allocated to the sub-field SF6.

FIG. 4 is a timing diagram illustrating the waveforms of driving signals used to drive a PDP, according to an embodiment of the present invention. Referring to FIG. 4, a pre-reset period is followed by a first sub-field. During the pre-reset period, positive wall charges are generated on scan electrodes Y and negative wall charges are generated on sustain electrodes Z. Each sub-field includes a reset period for initializing discharge cells with reference to the distribution of wall charges generated during the pre-reset period, an address period for selecting a number of discharge cells, and a sustain period for enabling the selected discharge cells to cause a number of sustain discharges.

A reset period includes a set-up period during and a set-down period. During a set-up period, a ramp-up waveform is applied to all the scan electrodes Y at the same time so that all discharge cells each can cause a weak discharge, and that wall charges can be generated in the discharge cells, respectively.

During a set-down period, a ramp-down waveform whose voltage decreases from a positive voltage that is lower than a peak voltage of the ramp-up waveform is applied to all the scan electrodes Y so that each of the discharge cells can cause an erase discharge, and that whichever of the wall charges generated during the set-up period and space charges are unnecessary can be erased.

During an address period, a negative scan signal is applied to the scan electrodes Y, and at the same time, a positive data signal is applied to the address electrodes X. Due to the difference between the negative scan signal and the positive data signal and the wall charges generated during the reset period, an address discharge occurs, and a cell is selected. During the set-down period and the address period, a signal which maintains a sustain voltage is applied to the sustain electrodes Z.

During a sustain period, a sustain pulse is alternately applied to the scan electrodes Y and the sustain electrodes Z so that surface discharges can occur between the scan electrodes Y and the respective sustain electrodes Z as sustain discharges.

The waveforms illustrated in FIG. 4 are exemplary, and thus, the present invention is not restricted thereto. For example, the pre-reset period may be optional. In addition, the polarities and voltages of driving signals used to drive a PDP are not restricted to those illustrated in FIG. 4, and may be altered in various manners. An erase signal for erasing wall charges may be applied to each of the sustain electrodes Z after a sustain discharge. The sustain signal may be applied to either the scan electrodes Y or the sustain electrodes Z, thereby realizing a single-sustain driving method.

FIG. 5 is a flowchart illustrating a method of manufacturing a PDP according to an embodiment of the present invention. Referring to FIG. 5, in operation 500, a paste for forming a black matrix is applied onto an upper substrate. In operation 510, a paste for forming an electrode is applied onto the paste for forming a black matrix. The upper substrate may be formed of glass. A paste for forming a black matrix will hereinafter be referred to as a black matrix paste, and a paste for forming an electrode will hereinafter be referred to as an electrode paste.

The black matrix paste may include organic components that burn out during a firing operation and inorganic components such as glass frit and cobalt oxide ($Co_3O_4$). The glass frit of the black matrix paste may be 1.5-4 weight % of the black matrix paste. The glass frit of the black matrix paste is melted glass. Due to glass frit, the black matrix paste can be properly applied onto the upper substrate, and can form black matrices by being subjected to a firing operation.

More specifically, the glass frit of the black matrix paste may be 2.5-3.5 weight % of the black matrix paste. The inorganic components of the black matrix paste may be 25-40 weight % of the organic components of the black matrix paste. The glass frit of the black matrix paste may be 15-25 weight % of the inorganic components of the black matrix paste. In this case, it is possible to enhance the adhesiveness and stability of the black matrix paste, reduce the probability of the generation of air bubbles during a firing operation, and improve exposure and development margins for black matrices.

The ratio, by weight, of organic components, cobalt oxide, and glass frit in the black matrix paste may be 85.8%:11.1%:3.1%.

The viscosity of the black matrix paste may be 10-20 Pascal seconds. In this case, it is possible to reduce the probability of a nozzle for applying the black matrix paste being blocked by the black matrix paste and the probability of the black matrix paste excessively spreading out after being applied onto the upper substrate.

The black matrix paste may have a Fineness-Of-Ground (FOG) of less than 10 µm. In this case, it is possible to stably apply the black matrix paste onto the upper substrate.

The organic components of the black matrix paste may include photosensitive components such as photosensitive monomers, photosensitive oligomers, or photo-sensitive polymers. The organic components of the black matrix paste may also include additive components such as binders, photopolymerization initiators, ultraviolet (UV) absorbing agents, sensitizers, polymer stoppers, plasticizers, thickening agents, organic solvents, antioxidants, dispersing agents, organic or inorganic anti-settling agents, and leveling agents.

The electrode paste may have organic components that burn out during a firing operation and inorganic components, including glass frit and silver (Ag). The glass frit of the electrode paste may be 1.5-4 weight % of the electrode paste.

More specifically, the glass frit of the electrode paste may be 2-3 weight % of the electrode paste. Also, the organic components of the electrode paste may be 35-45 weight % of the inorganic components of the electrode paste, and the glass frit of the electrode paste may be 3-4.5 weight % of the electrode paste. In this case, it is possible to enhance the adhesiveness and stability of the black matrix paste, reduce the probability of the generation of air bubbles during a firing operation, and improve exposure and development margins for black matrices.

The ratio, by weight, of organic components, silver, and glass frit in the black matrix paste may be 25.98%:67.8%:2.3%.

The black matrix paste may have a FOG of less than 10 µm. In this case, it is possible to stably apply the black matrix paste onto the upper substrate.

The organic components of the electrode paste may include photosensitive components such as photosensitive monomers, photosensitive oligomers, or photo-sensitive polymers. The organic components of the electrode paste may also include additive components such as binders, photopolymerization initiators, ultraviolet (UV) absorbing agents, sensitizers, polymer stoppers, plasticizers, thickening agents, organic solvents, antioxidants, dispersing agents, organic or inorganic anti-settling agents, and leveling agents.

The electrode paste may include a conductive metal other than silver. For example, the electrode paste may include copper or two or more metallic compounds.

In order to form transparent ITO electrodes on the upper substrate, as illustrated in FIG. 2, the electrode paste may be applied onto the upper substrate before operation 500, i.e., the application of the paste for forming onto the upper substrate, so that black matrices can be disposed between ITO electrodes and scan electrodes or between ITO electrodes and sustain electrodes.

In operation 520, a dielectric material is laminated onto the upper substrate. In operation 530, a firing operation is performed on the upper substrate. The firing operation is an operation of transforming raw materials into hard materials by heating them.

More specifically, in operation 530, the firing operation may be performed by gradually increasing firing temperature. As a result, channels are generated in the dielectric material due to a solvent of the dielectric material and the organic components of the electrode paste that are vaporized at low temperatures, and then the organic components of the electrode paste burn out through the channels so that the dielectric material can be fired, and that electrodes can be formed on the upper substrate.

FIG. 8 is a graph for explaining a method of firing black matrices, electrodes, and a dielectric material at the same time, according to an embodiment of the present invention. Referring to FIG. 8, a black matrix paste may be dried and fired at a temperature of about 150° C. for twenty minutes, as indicated by reference numeral 800.

The method illustrated in FIG. 5 may be applied not only to the formation of electrodes, black matrices, and a dielectric material on an upper substrate of a PDP but also to the formation of address electrodes and a dielectric material on a lower substrate of a PDP.

FIG. 6 is a cross-sectional view of a structure including a substrate 630 and a black matrix paste 620, electrode pastes 600 and 610, and a dielectric material 640 that are formed on the substrate 630.

A thickness a of the black matrix paste 620, which is applied onto the substrate 630, may be 1.5-2.5 µm, and particularly, 1.7-2 µm. According to an embodiment of the present invention, the black matrix paste 620, the electrode pastes 600 and 610, and the dielectric material 640 may be fired at the same time. In this case, when the dielectric material 640 is laminated onto the substrate 630, the black matrix paste 620 is not fired yet. Thus, if the black matrix paste 620 is too thick, the spaces below the electrode pastes 600 and 610 may not be able to be filled with the dielectric material 640, thereby generating air bubbles during a firing operation.

When the thickness a is in the range of 1.5-2.5 µm, and particularly, 1.7-2 µm, it is possible to enhance the absorption of external light, reduce the reflection of light, increase the purity and contrast of the substrate 630, and reduce the probability of the generation of air bubbles during a firing operation.

A thickness of the electrode pastes 600 and 610, which are applied onto the substrate 630, may be 7-9 µm, and particularly, 7.5-8.5 µm. According to an embodiment of the present invention, the black matrix paste 620, the electrode pastes 600 and 610, and the dielectric material 640 may be fired at the same time. In this case, when the dielectric material 640 is laminated onto the substrate 630, the electrode pastes 600 and 610 are not fired yet. Thus, if the electrode pastes 600 and 610 are too thick, the spaces below the electrode pastes 600 and 610 may not be able to be filled with the dielectric material 640, thereby generating air bubbles during a firing operation.

A thickness d of portions of the dielectric material 640 on the substrate 630 may be 65-82 µm, and particularly, 75-80 µm. A thickness c of portions of the dielectric material 640 on the electrode pastes 600 and 610 may be 60-78 µm and particularly, 70-78 µm. In this case, the dielectric material 640, which is laminated onto the substrate 630 can properly serve its functions, and reduce the possibility of the generation of air bubbles during a firing operation by properly filling empty spaces, if any, below the electrode pastes 600 and 610.

FIG. 7 is a cross-sectional view of a structure obtained by performing a firing operation on the structure illustrated in FIG. 6. More specifically, FIG. 7 illustrates a structure resulting from a simultaneous firing of the black matrix paste 620, the electrode pastes 600 and 610, and the dielectric material 640 illustrated in FIG. 6. The black matrix paste 620 contracts more in a widthwise direction than in a lengthwise direction, whereas the electrode pastes 600 and 610 contract almost as much in a widthwise direction as they do in a lengthwise direction. The degree to which the black matrix paste 620 contracts is greater than the degree to which the electrode pastes 600 and 610 contract.

A thickness e of a black matrix 720, which is obtained by firing the black matrix paste 620, may be 0.25-0.45 μm, and particularly, 0.3-0.4 μm. A thickness f of electrodes 700 and 710, which are respectively obtained by firing the electrode pastes 600 and 610, may be 3-5 μm, and particularly, 3.4-4.5 μm. A thickness h of portions of an dielectric material 740 on a substrate 730 may be 25-35 μm. The dielectric material 740 and the substrate 730 are respectively obtained by firing the dielectric material 640 and the substrate 630. A thickness g of portions of the dielectric material 740 on the electrodes 700 and 710 may be 20-30 μm and particularly, 24-28 μm.

When the thicknesses of the black matrix 720, the electrodes 700 and 710 and the dielectric material 740 are as described above, it is possible to reduce the probability of the generation of air bubbles during a firing operation and prevent damage to a PDP. In other words, when the thicknesses a, b, c, and d are as described above with reference to FIG. 6, it is possible to properly fill empty spaces with a dielectric material and thus to prevent the generation of air bubbles during a firing operation. In addition, it is possible to thinly form black matrices, electrodes, and a dielectric material as described above.

FIGS. 9 and 10 illustrate black matrices, electrodes, and a dielectric material that are formed on a substrate using a firing operation, according to embodiments of the present invention. More specifically, FIG. 9 illustrates black matrices and electrodes by firing a black matrix paste containing 6.8 weight % of glass frit and an electrode paste containing 6 weight % of glass frit, and FIG. 10 illustrates black matrices and electrodes by firing a black matrix paste containing 2.8 weight % of glass frit and an electrode paste containing 2.3 weight % of glass frit.

Referring to FIG. 9, as the content of glass frit increases, more air bubbles are generated near electrodes and black matrices on a substrate after a firing operation. Referring to FIG. 10, when the content of glass frit is reduced as described above with reference to FIG. 5, it is possible to prevent the generation of air bubbles.

INDUSTRIAL APPLICABILITY

As described above, according to the present invention, it is possible to simplify the manufacture of a PDP by firing electrodes, black matrices, and a dielectric material at the same time. In addition, it is possible to reduce the probability of the generation of air bubbles by appropriately reducing the amount of glass frit in a paste. Moreover, it is possible to enhance the efficiency of driving a PDP and the reliability of a plasma display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A paste which is used to manufacture a plasma display panel (PDP), the paste comprising:
   organic components; and
   inorganic components including glass frit,
   wherein the glass frit is 1.5-4 weight % of the paste, and
   wherein the inorganic components are 25-40 weight % of the organic components and the inorganic components in combination.

2. The paste of claim 1, wherein the paste is an electrode paste for forming an electrode on the PDP, and the inorganic components include the glass frit and a conductive metal.

3. The paste of claim 2, wherein the glass frit is 3-4.5 weight % of the inorganic components.

4. The paste of claim 1, wherein the paste is a black matrix paste for forming a black matrix on the PDP, and the inorganic components include the glass frit and cobalt oxide.

5. The paste of claim 4, wherein the glass frit is 15-25 weight % of the inorganic components.

6. The paste of claim 5, wherein the paste has a Fineness-Of-Grind (FOG) of 10 μm.

7. The paste of claim 1, wherein the paste has a viscosity of 10-25 Pascal seconds.

8. A method of manufacturing a PDP including electrodes, black matrices, and a dielectric material, the method comprising:
   applying onto a substrate a black matrix paste for forming a black matrix and an electrode paste for forming an electrode;
   laminating a dielectric material on the substrate; and
   firing the black matrix paste, the electrode paste, and the dielectric material at the same time,
   wherein the electrode paste comprises organic components and inorganic components including glass frit and silver (Ag),
   wherein the glass frit is 1.5-4 weight % of the electrode paste, and
   wherein the inorganic components are 25-40% of the organic components and the inorganic components in combination.

9. The method of claim 8, wherein the black matrix paste comprises:
   organic components; and
   inorganic components including glass frit and cobalt oxide,
   wherein the glass frit is 1.5-4 weight % of the black matrix paste.

10. The method of claim 8, wherein a thickness of the electrode paste is 7-9 μm.

11. The method of claim 8, wherein a thickness of the black matrix paste is 1.5-2.5 μm.

* * * * *